(12) United States Patent
Kim et al.

(10) Patent No.: US 6,922,771 B2
(45) Date of Patent: Jul. 26, 2005

(54) VECTOR FLOATING POINT UNIT

(75) Inventors: Jason Seung-Min Kim, San Jose, CA (US); Robert Quan, San Francisco, CA (US)

(73) Assignee: PortalPlayer, Inc., Santa Clara, CA (US)

( * ) Notice: Subject to any disclaimer, the term of this patent is extended or adjusted under 35 U.S.C. 154(b) by 485 days.

(21) Appl. No.: 10/131,359

(22) Filed: Apr. 24, 2002

(65) Prior Publication Data

US 2003/0204706 A1 Oct. 30, 2003

(51) Int. Cl.[7] .......................... G06F 15/76; G06F 9/302; G06F 7/38; G06F 13/40
(52) U.S. Cl. .......................... 712/5; 712/222; 711/219; 710/317; 708/495
(58) Field of Search ............................... 712/5, 222, 4, 712/6; 711/219; 710/317; 708/495, 501, 508, 52

(56) References Cited

U.S. PATENT DOCUMENTS

| | | | | |
|---|---|---|---|---|
| 4,639,886 A | * | 1/1987 | Hashimoto et al. ......... | 708/521 |
| 4,849,923 A | * | 7/1989 | Samudrala et al. ......... | 708/505 |
| 4,974,198 A | * | 11/1990 | Ishii ............................... | 712/8 |
| 5,197,140 A | * | 3/1993 | Balmer ........................ | 711/220 |
| 5,805,875 A | * | 9/1998 | Asanovic .................... | 712/222 |
| 5,923,862 A | * | 7/1999 | Nguyen et al. ............. | 712/208 |

* cited by examiner

*Primary Examiner*—Daniel H. Pan
(74) *Attorney, Agent, or Firm*—David Jaffer; Pillsbury Winthrop Shaw Pittman LLP

(57) ABSTRACT

The present invention provides a vector floating point unit (FPU) comprising a product-terms bus, a summation bus, a plurality of FIFO (first in first out) registers, a crossbar operand multiplexor coupled, a floating point multiplier, and a floating point adder. The floating point multiplier and the floating point adder are disposed between the crossbar operand multiplexor and the product-terms and summation buses, and are in parallel to each other. The invention also provides the configuration register and the command register in order to provide flexible architecture and the capability to fine-tune the performance to a particular application. The invention performs the multiplication operation and the addition operation in a pipelined fashion. Once the pipeline is filled, the invention outputs one multiplication output and one addition output at each clock cycle. The invention reduces the latency of the pipelined operation and improves the overall system performance by separating the floating point multiplier from the floating point adder so that the multiplication operation can be executed separately and independently of the addition operation.

58 Claims, 6 Drawing Sheets

| 31 | 30 | 29 | 27 | 25 | 23 | 16 | 14 | 12 | 11 | 9 | 8 | 6 | 4 | 3 | 1 | 0 |
|---|---|---|---|---|---|---|---|---|---|---|---|---|---|---|---|---|
| E | rsvd | VER | fMUL | fADD | REPEAT (vector-length) | fMUL Rd | fMUL Rs1 | M1 IA | fMUL Rs0 | M0 IA | fADD Rd | fADD Rs1 | A1 IA | fADD Rs0 | A0 IA |

VECTOR FLOATING POINT UNIT

FIELD OF THE INVENTION

This invention relates generally to a floating point computation unit. More specifically, the invention relates to a vector floating point unit using pipelined and parallel processing architecture and a reconfigurable multiplexor.

BACKGROUND OF THE INVENTION

An FPU (floating point unit) is a type of coprocessor embedded in a more general microprocessor that manipulates numbers more quickly than the general, basic microprocessor. A coprocessor refers to a computer processor which assists the main processor by performing certain special functions, usually much faster than the main processor could perform them in software. The coprocessor often decodes instructions in parallel with the main processor and executes only those instructions intended for it. For example, an FPU coprocessor performs mathematical computations, particularly floating point operations. FPU coprocessors are also called numeric or math coprocessors. An FPU is often built into personal computers and servers which perform special applications such as graphic image processing or display. For example, in addition to math coprocessors, there also can be graphics coprocessors for manipulating graphic images.

An FPU coprocessor is designed to handle large, complex mathematical operations using floating point numbers. Floating point numbers are numbers that are carried out to a certain decimal position (such as 3.141598). In a digital system, floating point numbers are typically expressed in binary format (expressed in powers of 2). They are stored in three parts: the sign (plus or minus), the significant or mantissa which represents the fraction part of sign-magnitude binary significand with a hidden integer bit, and the exponent or order of magnitude of the mantissa, which determines the place and direction to which the binary point floats.

Since an FPU is used for highly complex, computation-intensive operations, its performance is closely tied to its throughput (e.g., the number instructions that are processed in a given period of time) and speed. For many digital signal processing needs such as for an RF encoder/decoder, audio/video compression encoder/decoder, or a cryptographic encoder/decoder, high-speed floating-point computations involving vector multiplication and addition operations are a critical design factor. Unfortunately, conventional FPUs fail to deliver the high vector processing speed required by high-performance digital signal processing systems. Some conventional vector FPUs use a pipelined architecture to implement vector multiplication and addition operations in order to improve the throughput. However, even with the pipelined architecture, conventional vector FPUs do not deliver the processing speed demanded by the high-performance digital signal processing systems because of their architectural limitations. For example, conventional FPUs, even if they are pipelined, execute the multiplication and addition operations in series in the pipeline. Due to the sequential execution of the multiplication and the addition, the pipeline latency in a conventional vector processor cannot be reduced below a certain point because the pipeline includes both multiplication and addition stages.

Further, conventional FPUs lack flexibility and are cost-inefficient. For example, a vector multiplication requires row-column multiplication of multi-dimensional input vector operands. This operation requires a large number of memory accesses of various kind including sequential read accesses and repeat read accesses. Often the conventional FPUs do not have a flexible architecture to handle the various types of memory accesses in an efficient manner. Also, the cost of constructing a flexible architecture FPU can be prohibitively expensive using conventional technology.

In view of the foregoing, it is highly desirable to provide a flexible, cost-efficient FPU. It is also desirable to provide a high-speed FPU with a throughput to meet the data processing speed required by high-performance digital signal processing systems without losing flexibility and cost-efficiency.

SUMMARY OF THE INVENTION

The present invention provides a vector floating point unit (FPU) comprising a product-terms bus, a summation bus, a plurality of FIFO (first in first out) registers, a reconfigurable multiplexor, a floating point multiplier, and a floating point adder. The floating point multiplier and the floating point adder are disposed between the crossbar operand multiplxor and the product-terms and summation buses, and are in parallel to each other. The floating point multiplier is separated from the floating point adder by the product-terms bus so that the multiplication operation can be executed separately and independently of the addition operation.

The overall vector floating point operation is controlled by a command controller, an instruction buffer, and a command sequencer. The instruction buffer stores and decodes microcode instructions, and issues control signals to the FIFO registers, the crossbar operand multiplexor, the floating point adder, and the floating point multiplier. The command sequencer is coupled to the instruction buffer and is responsible for decoding the micro-code instructions and providing control signals to various parts of the VFPU, including control signals for the sequencing of the execution of the instruction buffer. The invention also includes a configuration register and a command register in order to permit rapid configuration of the VFPU and provide flexible architecture and the capability to fine-tune the performance to a particular application.

In operation, vector input operands are stored in FIFO (first in first out) registers. The reconfigurable multiplexor routes data in the FIFO registers to the floating point multiplier or the adder depending on the desired application. The multiplication operation is executed in a pipelined fashion. Once the pipeline is filled, the invention outputs at least one multiplication output at each clock cycle. The outputs of the multiplication are stored in a FIFO registers. If necessary, the outputs of the multiplication stored in the FIFO registers are routed to the floating point adder for an addition operation. The addition operation is also executed in a pipelined fashion. Once the pipeline is filled, at least one addition output is produced at each clock cycle. For a separate multiplication or addition, the invention reduces the pipeline latency to the latency required for an execution of multiplication or addition.

BRIEF DESCRIPTION OF THE DRAWINGS

For a better understanding of the invention, reference should be made to the following detailed description taken in conjunction with the accompanying drawings, in which:

FIG. 5 illustrates the structure of one entry of the instruction buffer 203 in one embodiment of the invention.

Like reference numerals refer to corresponding parts throughout the drawings.

DETAILED DESCRIPTION OF A PREFERRED EMBODIMENT

The invention is particularly applicable to a vector FPU for vector floating point operatons, and it is in this context that the invention will be described. It will be appreciated, however, that the VFPU in accordance with the invention has greater utility, such as to other types of floating point or non-floating point calculations. To understand the VFPU in accordance with the invention, the basic structure of the VFPU and its operations will be described.

Overview—Vector FPU

Figure 1:
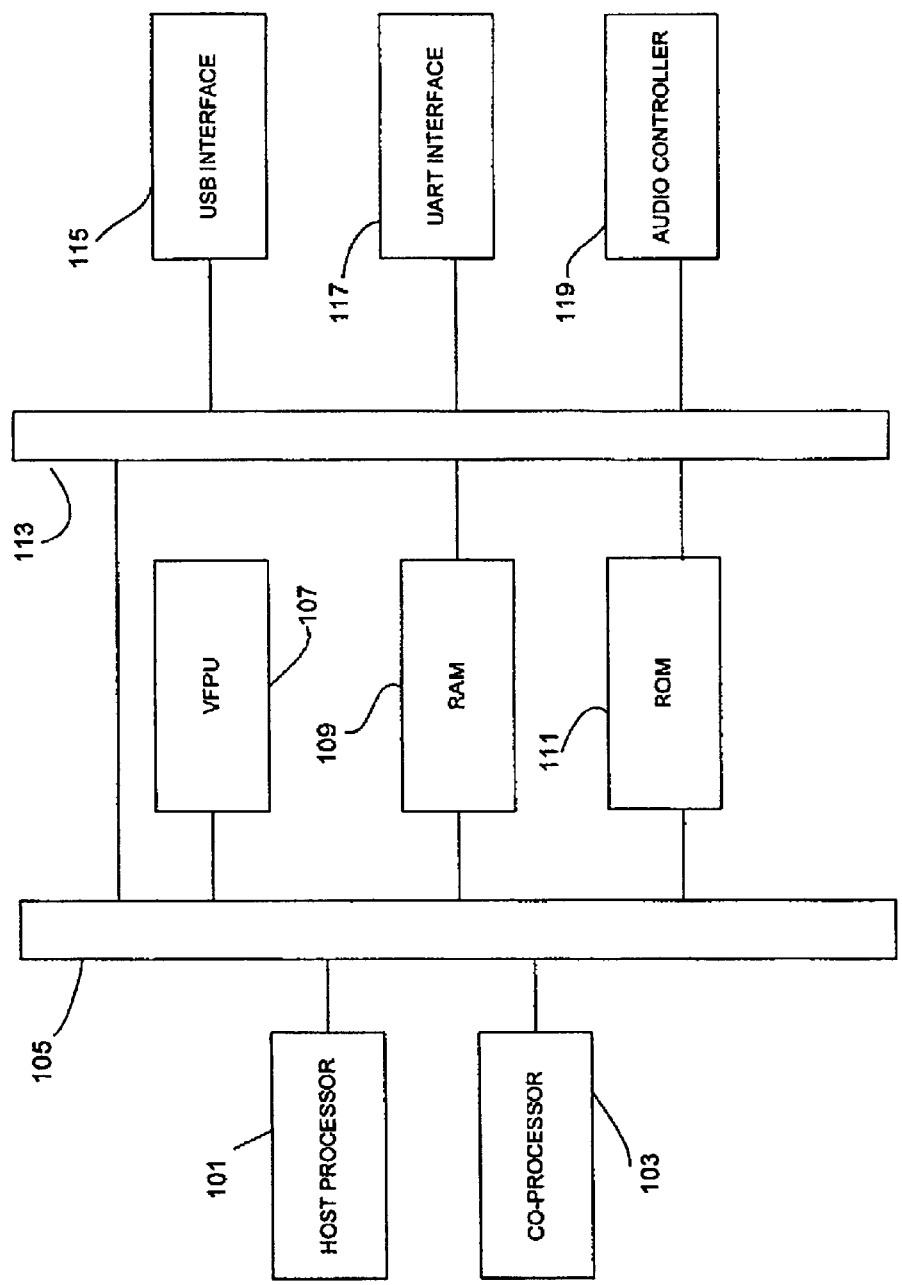
FIG. 1. Illustrates a system diagram of a vector floating point unit (VFPU) of the invention for performing floating point calculations.

FIG. 1. Illustrates a system diagram where a vector floating point unit (VFPU) 107 of the invention is provided to perform floating point calculations. As shown in FIG. 1, a VFPU is typically used in conjunction with one or more general microprocessor(s). In FIG. 1, a host processor 101 and a co-processor 103 are coupled to a VFPU 107 via a bus 105. A RAM (random access memory) 109 and a ROM (read only memory) 111 are also coupled to the bus 105. In addition, USB (universal serial bus) interface 115, a UART (universal asynchronous receiver transmitter) interface 117, and an audio controller 119 are coupled to the host processor 101 and co-processor 103 via the bus 105 and a second bus 113. Other peripherals may be coupled to the host processor 101 and co-processor 103 as necessary.

In operation, the host processor 101 executes the main software program stored in a memory device such as ROM 111. The coprocessor 103 assists the host processor 101 by performing functions. In FIG. 1, the coprocessor 103 sends control signals and data to the VFPU 107 in order to perform a floating point calculation. In response to the control signal and data from the coprocessor 103, the VFPU 107 performs the specified floating point operation, and sends the result back to the coprocessor. Since the coprocessor must wait for the result to come back from the VFPU for further processing, the performance of the coprocessor and the performance of the whole system often depends on the performance of the VFPU, especially if the task of interest involves a large number of floating point calculations.

The performance of the VFPU can be measured by two factors: latency and throughput. The latency is the difference between the time data is input into the VFPU and the time data is output from the VFPU. Because the coprosessor 103 must wait until the VFPU starts to generate output data, the latency is wasted time from an overall performance standpoint.

The throughput of the VFPU is the amount of work that the VFPU can do in a given time period. For example, a VFPU outputs a certain number of calculation results per clock period. The latency becomes a less critical factor as the number of floating point operations increases because the ratio of the latency to the total amount of time required to complete the floating point operations decreases as the number of floating point operations increases. The invention reduces the latency and improves the system throughput by using pipelining and parallel processing techniques, as will now be described.

Vector Floating Point Unit (VFPU)

Figure 2:
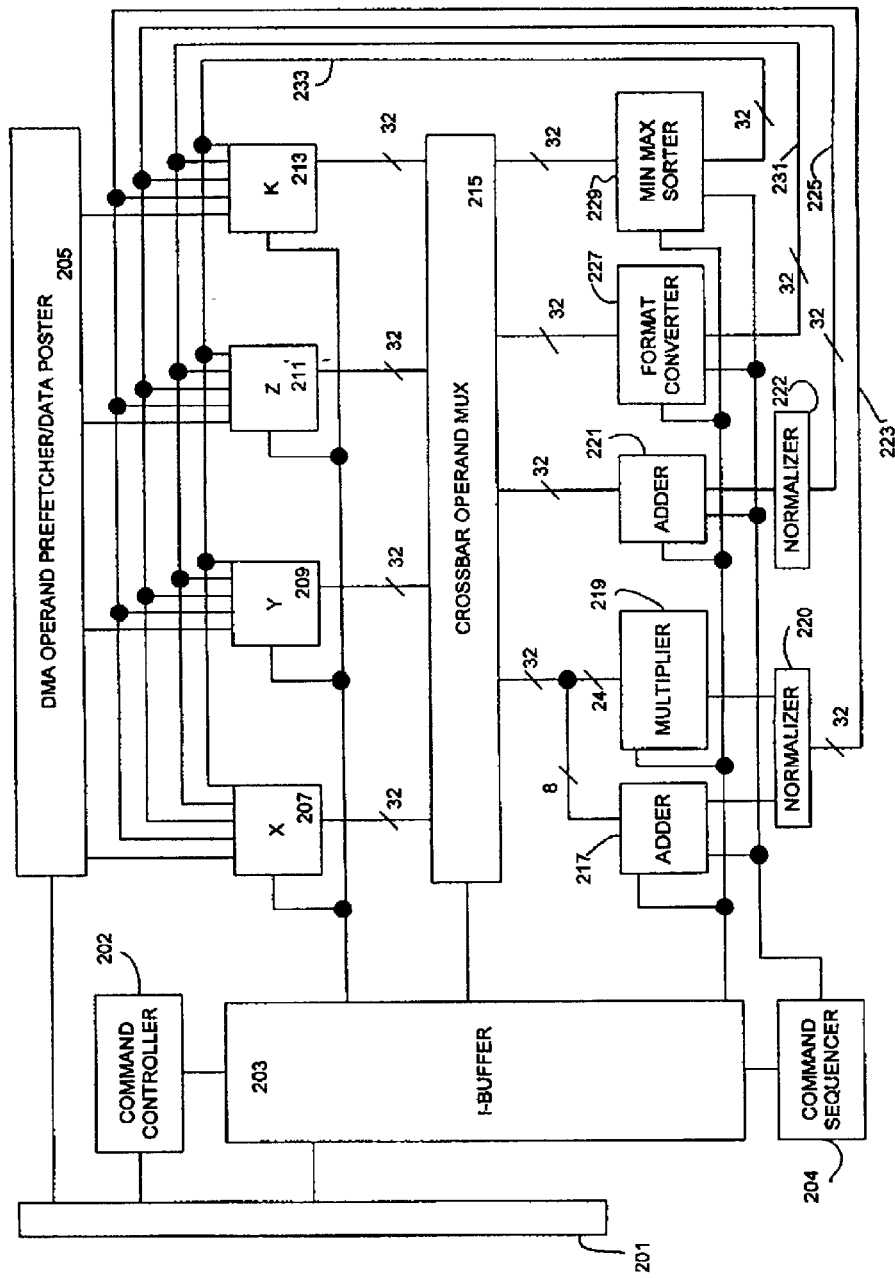
FIG. 2 illustrates the block diagram of a vector floating point unit constructed in accordance with one embodiment of the invention.

FIG. 2 illustrates the block diagram of a vector floating point unit (VFPU) constructed in accordance with the invention. In FIG. 2, the VFPU comprises a command controller 202, an instruction buffer 203, a command sequencer 204, four (4) memories, 207, 209, 211, 213 (X, Y, Z and K buffers), a crossbar multiplexor 215, an adder 217, a multiplier 219, an adder 221, a format converter 227 (well-known in the art, not shown in detail) and a min/max sorter 229 (well-known in the art, not shown in detail). The adder 217 and the multiplier 219 constitute a floating point multiplier. In alternate embodiments of the invention, it is possible to add or remove units coupled to the crossbar operand mux 215. For example, a saturation filter may be coupled to the crossbar operand mux 215 in addition to the adder 217, the multiplier 219, the adder 221, the format converter 227 and the min/max sorter 229. Alternatively, a particular application may only need a subset of the units 217, 219, 221, 227, and 229.

The X, Y, Z, K memories 207–213 are used as storage devices. In one embodiment of the invention, FIFO (first in first out) registers are used as memories 207–213. However, it will apparent to one skilled in the art that other types of devices may be used to implement X, Y, Z, and K memories. For example, LIFO (last in first out) or buffers may be used as X, Y, Z and K memories.

Referring to FIG. 2, the crossbar multiplexor 215 is used to receive data signals from any of the memories 207–213, and route them to the proper, one or more, destinations. Any suitable multiplexor can be used as the crossbar multiplexor 215. One type of multiplexor that can be used as the crossbar multiplexor 215 is a series of logic gates wherein any input can be connected to any output. The command controller 202 is coupled to a host processor bus 201 and the instruction buffer 203. The instruction buffer 203 is coupled to the host processor bus 201 to receive data and signals. The host processor bus 201 is also coupled to a DMA operand prefetcher/data poster 205, which in turn is coupled to the memories 207–213.

The memories 207–213 are coupled to the crossbar multiplexor 215, which is coupled to the adder 217, the multiplier 219, and the adder 221. In a preferred embodiment of the invention, each memory 207–213 is 32 bits wide and contains 32 entries. However, it will be apparent to one skilled in the art that other sizes may be used for the memories as appropriate without departing from the scope of the invention. Data may be provided to the memories 207–213 by the instruction buffer 203 or the operand prefetcher/data poster 205. The operand prefetcher/data poster 205 may fetch data from a main memory and provide directly to the memories 207–213 without going through the instruction buffer 203. The operand prefetcher/data poster 205 may comprise an address generation unit for generating memory addresses. Linear addressing or non-linear addressing based on reverse windowing may be used the address generation unit.

The adder 217 and the multiplier 219 are coupled to a normalizer circuit 220, which is coupled to a product-terms bus 223. The adder 221 is coupled to a normalizer circuit 222, which is coupled to a summation bus 225. The adder 217 is an integer adder (well-known in the art, not shown in detail), and any general purpose fixed-point arithmetic unit can be used as the adder 217. The adder 221 is a floating point adder, which is described below in greater detail with reference to FIG. 3.

For a floating point multiplication, when two input operands arrive from the crossbar multiplexor 215, their exponents are added by the adder 217 and the mantissas are multiplied by the multiplier 219. Any suitable integer multiplier circuit or algorithm may be used as the multiplier 219. In a preferred embodiment of the invention, the multiplier 219 is an integer multiplier. The adder 217 and the multiplier 219 perform floating point multiplication operations. After the multiplication, the outputs of the multiplier 219 and the exponent adder 217 are provided to the normalizer 220.

The product-terms bus 223 receives the output of the normalizer circuit 220 and provides it to the registers 207–213 in a feedback loop. Similarly, the summation bus 225 receives the output of the normalizer circuit 222 and provides it to the registers 207–213 in a feedback loop. The format converter 227 and the min/max sorter 229 are coupled to the buses 231 and 233, respectively. The outputs available on the buses 223, 225, 231 and 233 may be provided to the data poster 205.

The command controller 202 receives data and control signals from the host processor bus 201. The command controller 202 issues control signals to the instruction buffer 203 to designate the start address of the operation or to control repeat sequences. The instruction buffer 203 stores and decodes microcode instructions, and issues control signals based on the decoded microcode instructions to the memories 207–213, the crossbar multiplexor 215, the adders 217, 221, and the multiplier 219. The instruction buffer 203 also can detect the completion of a microcode execution and reload the instruction buffer 203 with the initial microcode address for re-execution, if necessary. The command sequencer 204 is coupled to the instruction buffer 203. The command sequencer 204 also decodes the microcode instructions received from the instruction buffer 203, and issues timing control signals for various parts of the VFPU. Now the floating point adder 221 will be described.

Figure 3:
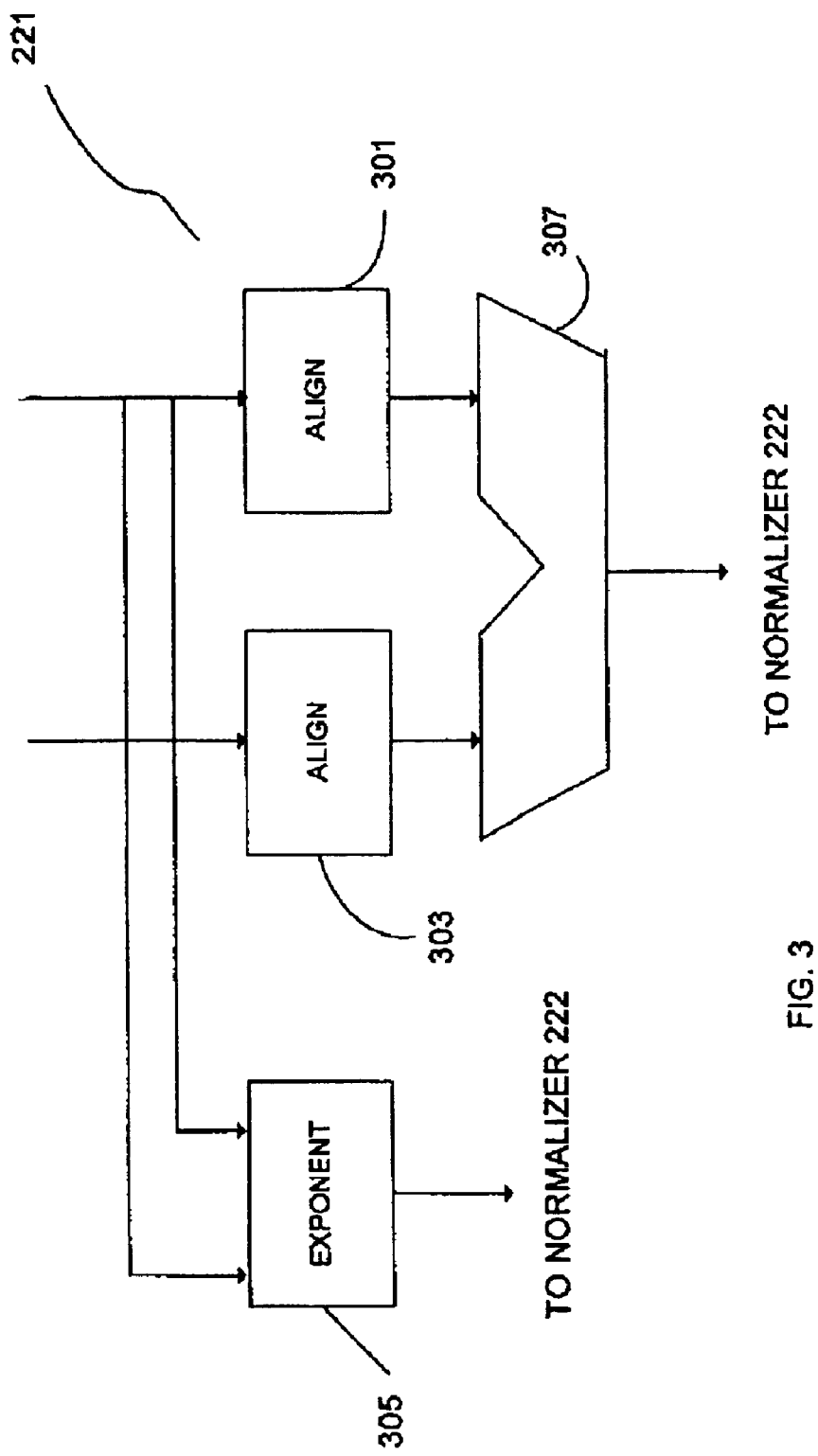
FIG. 3 illustrates a block diagram of the adder 221 of FIG. 2 in one embodiment of the invention.

FIG. 3 illustrates a block diagram of the floating point adder 221 in one embodiment of the invention. Floating point additions are more complicated than integer additions because the exponents of the two input operands must be made equal before the addition of the corresponding mantissas. In FIG. 3, the floating point adder 221 comprises alignment circuitry 301 and 303, exponent processing circuitry 305, and an integer adder 307. Any general purpose fixed-point arithmetic unit can be used as the adder 307.

In operation, when two inputs come in, their exponents are compared by the exponent circuitry 305 by computing (exponent of input 1)−(exponent of input 2). The exponent circuitry 305 stores the result in a counter, E (not shown). The larger exponent of the two inputs is determined by the sign of E. Next, the two inputs are aligned by the alignment circuitry 301 or 303 by shifting the mantissa of the appropriate input. After each shifting of the mantissa, the magnitude of E is decremented. When E reaches zero, shifting stops and the alignment is complete. Once the mantissas are aligned, they can be added as if they are integers. After the addition, the outputs of the integer adder 307 and the exponent processing circuitry 305 are provided to the normalizer 222 of FIG. 2. It will be apparent to one skilled in the art that other embodiments may be used to implement the floating point adder 221 as long as the floating point adder meets the timing requirements of the system.

X, Y, Z, and K Memories

X, Y, Z, and K FIFOs are buffer memories that hold values of data. In a preferred embodiment, X, Y, Z, and K memories are implemented by FIFO (first in first out) memories that are 32 bits wide and have 32 entries. However, it will be apparent to one skilled in the art that other sizes may be selected for the memories as appropriate without departing from the scope of the invention. For example, X, Y, Z, and K may be operated in a circular mode or in a non-linear mode. In a circular mode, the data popped out of a buffer, for example X, is routed back to the same buffer, X, after use. In a non-linear mode, the data is obtained from a buffer, for example X, but is not popped out so that the data is retained by the buffer.

Figure 4A:
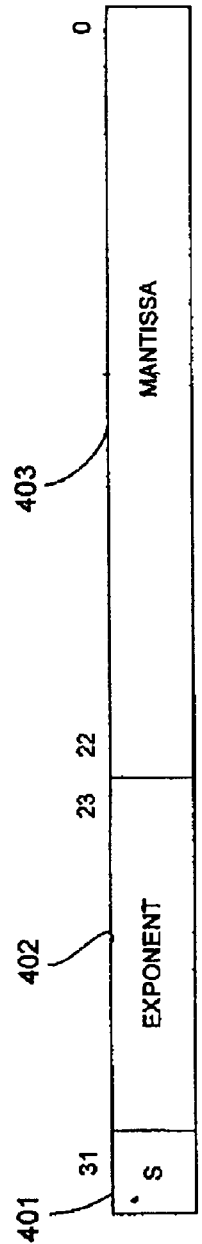
FIG. 4(A) illustrates the structure of a FIFO memory that can used to implement the X, Y, Z and K registers.

FIG. 4(A) illustrates an example of the structure of data in a FIFO memory that can used to implement the X, Y, Z and K registers. In FIG. 4(A), an entry of the FIFO register has a width of 32 bits comprising an "s" 401, exponent 402 and mantissa 403 fields. The mantissa field 403 is used to hold the value of a mantissa of a floating point number, and the exponent field 402 holds the value of an exponent of the floating point number. The "s" bit 401 is used to indicate the sign of the number.

Figure 4B:
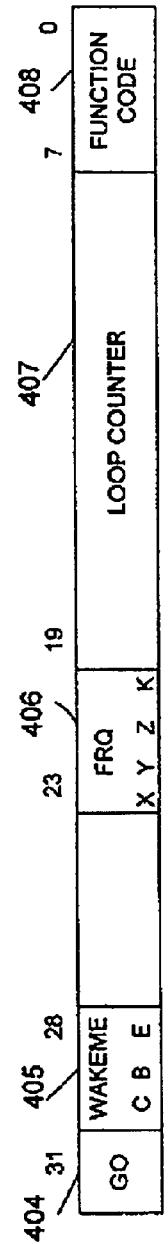
FIG. 4(B) illustrates the structure of a VFPU command register.

FIG. 4(B) illustrates the structure of a VFPU command register. In a preferred embodiment of the invention, the VFPU command register resides in the command controller 202. However, it will be apparent that the VFPU command register can be implemented outside the command controller 202 by separate circuitry or as part of other circuit block without departing from the scope of the invention.

Referring to FIG. 4(B), A GO bit 404 is used to trigger a pulse to start the VFPU operation at the function code index 408. The function code of the command register indicates the starting address of the microcode instructions within the instruction buffer 203. Setting he GO bit enables parallel execution of the VFPU and the host processor 101 and/or the coprocessor 103. The WAKEME field 405 comprises three (3) bits: C, B, and E. The C bit, when set, disables a ready signal to the host processor 101 or the coprocessor 103 until function code execution is completed. The ready signal is used to enable the host processor 101 or the coprocessor 103 to advance to the next instruction. Thus, the C bit, when set, allows the VFPU 107 to prevent the host processor 101 or the coprocessor 103 from advancing to next instruction. The C bit may be set when the host processor 101 or the coprocessor 103 needs to wait until a VFPU operation is completed. In response to the C bit set, the VFPU control logic may withhold the assertion of the ready signal, thereby preventing the host processor 101 or the coprocessor 103 to stop execution until the VFPU operation is completed.

The B bit, when set, disables the ready signal to the host processor 101 or the coprocessor 103 until function code execution is completed or until a FIFO request is made. The E bit, when set, disables the ready signal to the host processor 101 or the coprocessor 103 until function code execution is completed or until an error condition such as overflow, or underflow occurs. The LOOP COUNTER field 407 is used to repeat the entire microcode sequence (LOOP COUNTER+1) times. The use of the LOOP COUNTER enables zero overhead command looping. The FRQ field 406 is used to enable X, Y, Z, and K memories in a FIFO mode. The function code 408 is used to store the starting address of the microcode instructions in the instruction buffer 203.

Figure 4C:
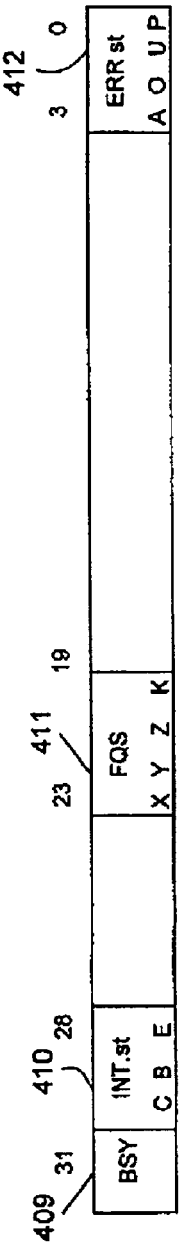
FIG. 4(C) illustrates the structure of a VFPU status register.

FIG. 4(C) illustrates the structure of a VFPU status register. In a preferred embodiment of the invention, the VFPU status register resides in the command controller 202. However, it will be apparent that the VFPU status register can be implemented outside the command controller 202 by separate circuitry or as part of other circuit block without departing from the scope of the invention.

A BSY bit 409 is used to indicate whether the VFPU is running or not. The INT.st field 410 comprises three (3) bits: C, B, and E. The C bit, when set, indicates that the VFPU code execution is completed. The B bit, when set, indicates that a FIFO request is pending. The E bit, when set, indicates that an error condition such as overflow, or underflow occurred. The FQS field 411 comprises four (4) bits: X, Y, Z, and K. The X, Y, Z and K bits, when set, indicate that X-FIFO, Y-FIFO, Z-FIFO, and K-FIFO requests are pending, respectively. The ERR.st field 412 comprises four (4) bits: A, O, U, and P. The A bit is used to indicate that an abort condition has been detected. The O bit, when set, indicates that an overflow condition has been detected. The U bit, when set, indicates that an underflow condition has been detected. The P bit, when set, indicates that an invalid operation condition has been detected.

Figure 4D:
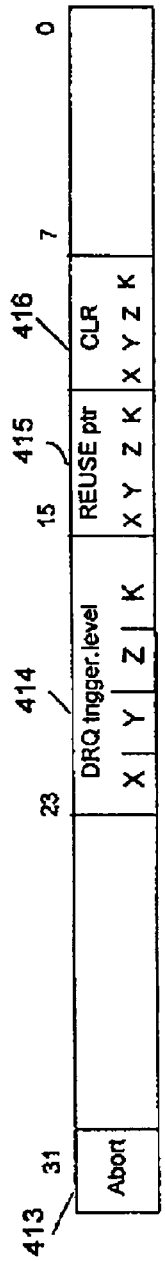
FIG. 4(D) illustrates the structure of a VFPU configuration register.

FIG. 4(D) illustrates the structure of a VFPU configuration register. In a preferred embodiment of the invention, the VFPU configuration register resides in the command controller 202. However, it will be apparent that the VFPU configuration register can be implemented outside the command controller 202 by separate circuitry or as part of other circuit block without departing from the scope of the invention.

The Abort bit 413, when set, triggers a pulse to abort the VFPU code execution. The REUSE.ptr field 415 comprises four (4) bits: X, Y, Z, and K. The X, Y, Z and K bits, when set, indicate that X-FIFO, Y-FIFO, Z-FIFO, and K-FIFO are reusable, respectively. Thus, when X, Y, Z and K bits are set, X-FIFO, Y-FIFO, Z-FIFO, and K-FIFO may operate in a circular mode.

The DRQ.trigger.level field 414 comprises four (4) fields: X-FIFO, Y-FIFO, Z-FIFO, and K-FIFO. The X-FIFO, Y-FIFO, Z-FIFO and K-FIFO fields are used to indicate the request trigger level of the X-FIFO, Y-FIFO, Z-FIFO, and K-FIFO, respectively. The CLR field 416 comprises four (4) bits: X, Y, Z, and K. The X, Y, Z and K bits, when set, trigger a pulse to clear all pointers and counters in X-FIFO, Y-FIFO, Z-FIFO, and K-FIFO, respectively. Now the instruction buffer and an example of an instruction will be provided.

Instruction Buffer

The instruction buffer 203 comprises a memory and logic gates necessary to implement memory reads and writes. In a preferred embodiment, the memory is implemented by an asynchronous 64×32 memory. The instruction buffer 203 stores microcode instructions to execute the vector floating point operations. The instruction buffer 203 also determines when to reload the instruction buffer with the initial microcode address so that the entire micro-code sequence can be re-executed. An example of an instruction will now be provided.

FIG. 5 illustrates the structure of one entry of the instruction buffer 203 in one embodiment of the invention. In FIG. 5, the entry 500 has fields: E, rsvd, VER, f.MUL, F.ADD, REPEAT, f.MULRd, fMUL.Rs1, fMUL.Rs0, fADD.Rd, fADD.Rs1, fADD.Rs0, M1.IA, M0.IA, A1.IA, and A0.IA. The E bit indicates the end point of a function after (REPEAT+1) is reached. The VER field indicates the version number of the particular function. The rsvd field is reserved for future use. The fMUL field controls the type of operation to be performed by the units 217 and 219. For example, 00 in fMUL field may be used to indicate no operation, 01 to indicate a float-to-integer conversion, 11 to indicate a multiplication. Similarly, 00 in fADD field may be used to indicate no operation, 01 to indicate a integer-to-float conversion, 11 to indicate an addition.

The REPEAT field stores the number of repeat operations for the current micro-code instruction. The current micro-code instruction is repeated (REPEAT+1) times. The use of the REPEAT field enables zero overhead instruction looping. The fMUL.rd indicates the address of the destination FIFO. For example if fMUL.Rd is 00, the result is stored in X-FIFO 207. The fMUL.Rs1 indicates the address of the source of a second operand for multiplication. The fMUL.Rs0 indicates the address of the source of a first operand for multiplication. The fADD.Rd indicates the address of the destination FIFO. For example if fADD.Rd is 01, the result is stored in Y-FIFO 209. The fADD.Rs1 indicates the address of the source of a second operand for addition. The fADD.Rs0 indicates the address of the source of a first operand for addition. The M0.IA and M1.IA are used to pop out the source FIFO of the first and second multiplication operands respectively. When reset, the M0.IA and M1.IA bits send control signals to reuse the current data without popping the FIFO. The A0.IA and A1.IA are used to pop out the source FIFO of the first and second addition operands respectively. When reset, the A0.IA and A1.IA bits send control signals to reuse the current data without popping the FIFO.

Using the configuration register and the instruction buffer, a user can reconfigure the system and fine-tune the performance of the VFPU to a particular application. For example, the user can adjust the properties of the memories 207–213 by modifying the REUSE bits in the configuration register shown in FIG. 4(C). When set, the reuse bits reconfigure the crossbar operand multiplexor 215 in order to reroute the data popped out of a memory back into the memory for reuse. When the reuse bits are reset, the data popped from a FIFO are discarded. Thus by adjusting the REUSE bits of the configuration register, the invention can reconfigure the memories to function as a FIFO or as a register.

Further, by adjusting the M0.IA and M1.IA and A0.IA and A1.IA bits, the invention allows reuse of the current data in the memory without popping a FIFO. This feature is especially useful when operating on multi-dimensional input operands, which require row and column multiplication. For example, when a row of a first input vector is multiplied with the second input vector, the invention resets the M0.IA bit so that the memory that contains the row data is not popped and reused repeatedly until the multiplication with the column entries of the second input vector is completed.

Also, by modifying source and destination addresses in the instruction buffer shown in FIG. 5, the invention reconfigures the crossbar operand multiplexor 216 and change the source of input operands to the multiplier 219 and the adder 221. Further, the modification of the configuration register and the instruction buffer can be made dynamically without stopping the operation of the VFPU. Now an example of an application of the VFPU is provided to illustrate the invention.

Application—Vector Multiplication of X[16] and Y[16]

For floating point numbers, the multiplication proceeds separately for the exponents and mantissas. Floating point multiplication requires a fixed point multiplication of the mantissas and a fixed point addition of the exponents. An additional step is required to normalize the result of the multiplication. Because the product of an addition or multiplication may contain leading zeros in the mantissa, the normalizer 220, and 222 eliminates such leading zeros by shifting the mantissa and adjusting the exponent accordingly.

Figure 6:
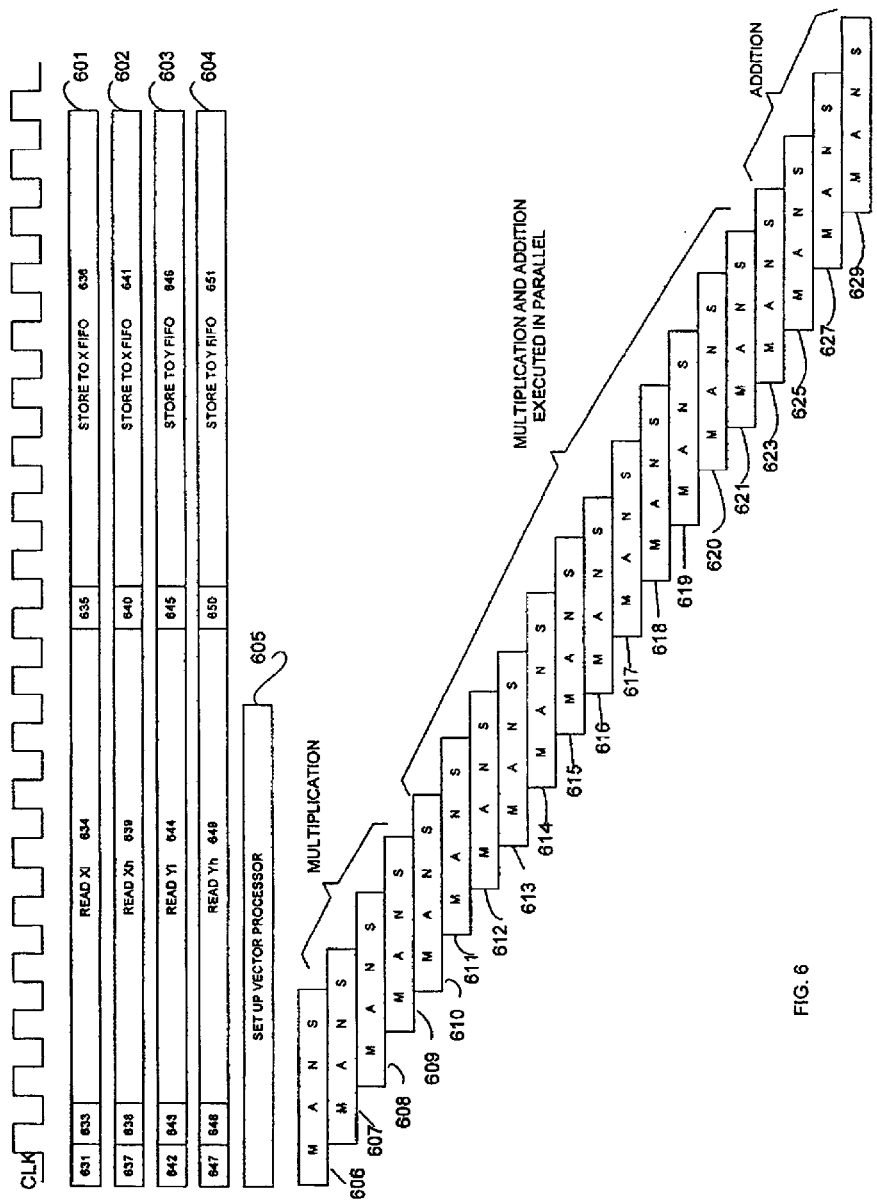
FIG. 6 illustrates the timing diagram of a floating point multiplication for X and Y in one embodiment of the invention.

FIG. 6 illustrates the timing diagram of a floating point multiplication for X and Y in one embodiment of the invention, in which X and Y are vectors or matrices having sixteen (16) elements in them. Mathematically, the example operation performed in FIG. 6 can be expressed as:

$$Z=[X]*[Y]+K \quad (1)$$

where X, Y are vectors with sixteen (16) elements, and Z and K are scalar values. K is a constant. According to equation (1), there are two (2) steps to be performed: multiplication and addition. It will be appreciated by one skilled in the art that K may be a vector and may be a variable without departing from the scope of the invention.

An exemplary microcode instructions for loading and storing input vectors and constant value into the X, Y, and K memories can be written as follows:

```
/* microcode instructions for vector floating point operations in
   eq. (1)*/

LDM R, Xl      /* load Xl into R register - step 634 */
STM R, X       /* store Xl in X-FIFO - step 636 */
LDM R, Xh      /* load Xh into R register - step 639 */
STM R, X       /* store Xh in X-FIFO - step 641 */
LDM R, Yl      /* load Yl into R register - step 644 */
STM R, Y       /* store Yl in Y-FTFO - step 646 */
LDM R, Yh      /* load Yh into R register - step 649 */
STM R, Y       /* store Yb in Y-FTFO - step 651 */
LDR R, K       /* load K into register R - step 605 */
STR R, K       /* store K in K-FTFO - step 605 */
LDR R, W       /* set Wait - step 605 */
STR R, CMD     /* store Wait to command register to start
                  the vector operation - step 605*/
```

In operation, in steps 601–604, X and Y are read and loaded into X and Y FIFOs 207 and 209, respectively. In step 601, the lower eight (8) elements of vector X or Xl, is read and loaded into X FIFO 207. Similarly, in step 602, the remaining eight (8) elements of X or Xh is read and loaded into X register 207. Y is read and loaded into Y register 209 in steps 603 and 604. As can be seen in FIG. 6, each step 601–604 takes 19 clock cycles in this particular embodiment. Cycles 631, 637, 642, and 647 are used to fetch an instructions, and cycles 633 and 635 are used to decode the fetched instructions. Step 601 comprises stage 634 for reading Xl, and stage 636 for storing Xl into X FIFO.

Step 605 sets up the VFPU by loading the K register 213 with the value of the constant K, and loading instructions necessary to perform floating point multiplications. Steps 601–605 are executed in sequence.

After loading X, Y, and K FIFOs and setting up the vector processor in steps 601–605, the VFPU proceeds to perform multiplication of X and Y in steps 606–621. In conventional vector processing systems, the multiplication and addition operations of eq. (1) are performed in sequence so that the addition of constant K by the adder 221 would have to wait until the multiplication operation completes and outputs the multiplication product. In contrast to the conventional vector processing systems, the invention separates the multiplication and addition operations using a bus and memory buffers so that the multiplication and addition operations can be performed simultaneously independent of each other.

Because X and Y are vectors having sixteen (16) elements in this example, the execution of eq. (1) takes a total of sixteen (16) multiplication operations and sixteen (16) addition operations. The multiplier 219 of FIG. 2 performs the multiplication operations in steps of 606–621. The adder 221 of FIG. 2 performs the addition operations in steps of 610–629. Thus, in steps 610–621, the multiplication and addition operations are performed in parallel by the multiplier 219 and the adder 221, as illustrated in FIG. 6. There are a total of sixteen (16) multiplication steps and sixteen (16) addition steps performed in the example shown in FIG. 6.

Each multiplication in steps 606–621 may comprise four (4) phases: i] a multiply by the multiplier 219; ii] an add by the adder 217, iii] a normalize by the normalizer 220; and iv] a store. Each addition in steps 610–629 may comprise four (4) phases: i] a multiply (this is actually an alignment step by the alignment circuitry 301 and 303); ii] an add by the adder 307; iii] a normalize by the normalizer 222; and iv] a store. The multiply and add phases may be executed in any sequence or in parallel.

As shown in FIG. 6, the invention may execute the multiplication and addition operations in a pipelined fashion. The first multiplication result is available after four (4) phases in step 606. The pipeline architecture allows the second multiplication step 607 to start at completion of the multiply phase of step 606 without having to wait until the whole 606 step is completed. Similarly, steps 608–621 can start without waiting for the completion of the previous multiplication step so that one multiplication product is output to the product-terms bus 223 at each clock cycle. The output of the multiplication operation (by the adder 217 and the multiplier 219) is fed to the product-terms bus 223, and stored in the Z-FIFO 211. The stored data in Z-FIFO is then routed by the crossbar operand multiplexor 215 to the adder 221 for the addition of constant K.

The pipeline is full in the example shown in FIG. 6 when the first addition output is generated by the adder 221. The time to fill the pipeline is called the latency of the pipelined system. The latency in the example shown in FIG. 6 is eight (8) clock cycles to perform eq. (1) because the first addition step 610 is completed four (4) clock cycles after the multiplication step 609 is completed. However, it will be appreciated by one skilled in the art that the length of the latency can be varied without departing from the scope of the invention. Once the pipeline is filled, the addition operation by the adder 221 can start with the same throughput as the multiplier 219, and outputs one addition result each clock cycle. After completion of the step 621, four (4) addition operations are required to add constant K.

The product-terms bus 223 separates the multiplication operation (by the adder 217 and the multiplier 219) from the addition operation (by the adder 221), and allows the addition operation to be executed separately and independent of the multiplication operation. Thus, in steps 611–621, both multiplication and addition operations are executed in parallel, independent of each other. Further, the separation by the product-terms bus allows the invention to use the VFPU in a flexible manner. For example, for a particular application requiring an execution of the following vector equation (2):

$$Z=[X]*[Y] \quad (2)$$

the latency of the pipeline will be only four (4) clock cycles instead of eight (8) clock cycles since there are four (4) phases for an individual multiplication operation. Thus, the first result of multiplication will be available at the product-terms bus 223 after four (4) clock cycles.

In contrast to the invention, conventional vector floating point units execute multiplication and addition operation in a batch fashion and the multiplication and addition operation cannot be performed separately. Thus, regardless of whether only a multiplication is required or a combined operation of multiplication and addition is required, the latency of the pipeline is always the combined latency of the multiplication or addition stages. Thus, in conventional VFPUs, the latency cycle will be eight (8) clock cycles in the above example regardless of whether eq. (1) is executed or eq. (2) is executed. On the other hand, since the VFPU of the invention separates the multiplication stage from the addition stage, the latency of the pipeline can be as short as the latency of each separate multiplication or addition stage.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus the foregoing descriptions of specific embodiments of the present invention are presented for purposes of illustration description. They are not intended to be exhaustive or to limit the invention to the precise forms disclosed. It will be appreciated by those skilled in the art that changes in this embodiment may be made without departing from the principles and spirit of the invention, the scope of which is defined by the appended claims.

What is claimed is:

1. A vector floating point unit (VFPU), comprising:
   a plurality of data sources;
   a multiplexor coupled to said plurality of data sources;
   a floating point multiplier coupled to said multiplexor;
   a first adder coupled to said multiplexor;
   a first bus coupled to said floating point multiplier and to said plurality of data sources; and
   an operation prefetcher coupled to said plurality of data sources, wherein said operand prefetcher comprises an address generation unit for incrementing or decrementing an address by a predetermined amount, and wherein said address generation unit generates addresses based on bit reverse windowing.

2. The VFPU of claim 1 further comprising an instruction buffer coupled to said plurality of data sources, said multiplexor, said floating point multiplier, and said first adder.

3. The VFPU of claim 2 wherein said instruction buffer comprises an entry to control an addition, said entry comprising a first field for indicating one of said plurality of data sources as a source of an operand for said addition and a second field to indicate one of said plurality of data sources as a destination for a result of said addition.

4. The VFPU of claim 3 wherein said entry further comprises a third field to indicate one of said plurality of data sources as a source of an operand for said multiplication and a fourth field to indicate one of said plurality of data sources as a destination for a result of said multiplication.

5. The VFPU of claim 4 wherein said entry further comprises a fifth field to control a reuse for data from one of said plurality of data sources.

6. The VFPU of claim 5 wherein said entry further comprises a sixth field to repeat an instruction contained in said entry.

7. The VFPU of claim 6 further comprising a command controller coupled to said instruction buffer.

8. The VFPU of claim 7 wherein said command controller comprises a command register comprising a loop counter field for repeating a command, a go field for parallel execution, and a wakeme field for sequential execution.

9. The VFPU of claim 8 wherein said command controller further comprises a configuration register comprising a code execution enable field, and a FIFO request trigger level field.

10. The VFPU of claim 9 wherein said multiplexor comprises a reconfigurable crossbar operand multiplexor.

11. The VFPU of claim 10 further comprising a second bus coupled to said first adder and to said plurality of data sources.

12. The VFPU of claim 11 further comprising a third bus coupled to a format converter and to said plurality of data sources.

13. The VFPU of claim 12 further comprising a fourth bus coupled to a min/max sorter and to said plurality of data sources.

14. The VFPU of claim 13 where in said first and second buses are coupled to a data poster.

15. The VFPU of claim 14 wherein said floating point multiplier comprises a second adder and an integer multiplier.

16. The VFPU of claim 15 wherein said first adder comprises an exponent processing unit, a plurality of alignment units, and an integer adder coupled to said plurality of alignment units.

17. The VFPU of claim 14 further comprising a command sequencer coupled to said instruction buffer.

18. The VFPU of claim 14 wherein said plurality of data sources comprise reconfigurable FIFO (first in first out) registers.

19. The VFPU of claim 14 wherein said first bus comprises a product-terms bus.

20. The VFPU of claim 19 wherein said second bus comprises a summation bus.

21. A vector floating point unit (VFPU), comprising:
   a plurality of first in first out (FIFO) register;
   an operand prefetcher/data poster coupled to said plurality of FIFO registers;
   a crossbar multiplexor coupled to said plurality of FIFO registers;
   a floating-point multiplier coupled to said crossbar multiplexor;
   an instruction buffer coupled to said plurality of FIFO registers, said
   crossbar multiplexor, said floating-point multiplier, wherein said instruction buffer comprises an entry to control an addition, said entry comprising a first field for indicating one of said plurality of FIFO registers as a source of an operand for said addition and a second field ti indicate one of said plurality of FIFO registers as a destination for a result of said addition; and
   a first bus coupled to the plurality of FIFO registers and said crossbar multiplexor.

22. The VFPU of claim 21 further comprising a second bus coupled to an adder and to said second bus plurality of FIFO registers.

23. The VFPU of claim 22 further comprising a command controller coupled to said instruction buffer.

24. The VFPU of claim 23 wherein said command controller comprises a command register comprising a loop counter field for repeating a command, a go field for parallel execution, and a wakeme field for sequential execution.

25. The VFPU of claim 24 wherein said entry further comprises a third field to indicate one of said plurality of FIFO registers as a source of an operand for said multiplication and a fourth field to indicate one of said plurality of FIFO registers as a destination for a result of said multiplication.

26. The VFPU of claim 25 wherein said entry further comprises a fifth field to control a reuse for one of said plurality of FIFO registers.

27. The VFPU of claim 26 wherein said entry further comprises a sixth field to repeat an instruction contained in said entry.

28. The VFPU of claim 27 wherein said adder comprises a floating point adder.

29. The VFPU of claim 28 wherein said multiplexor comprises a reconfigurable crossbar operand multiplexor.

30. The VFPU of claim 29 further comprising a third bus coupled to a format converter and to said plurality of FIFO registers.

31. The VFPU of claim 30 further comprising a fourth bus coupled to a min/max sorter and to said plurality of FIFO registers.

32. A method of vector floating point operation for a first and second vector multiplication operands having a plurality of elements respectively, said method comprising:
fetching said first and second vector multiplication operands from a data source for a multiplication operation;
executing said multiplication operation to produce a multiplication output;
providing said multiplication output to said data source;
fetching a first and second addition operands from said data source for an addition operation, wherein said fetching said first and second addition operands comprise:
routing said first addition operand from a first memory to an adder via said multiplexor; and
routing said second addition operand from a second memory to said adder via said multiplexor; and
executing said addition operation to produce an addition output.

33. The method of vector floating point operation of claim 32 wherein said first addition operand comprises said multiplication output.

34. The method of vector floating point operation of claim 33 wherein said data source comprises a multiplexor.

35. The method of vector floating point operation of claim 34 wherein said fetching said first and second vector multiplication operands comprises:
routing said first multiplication operand from a first memory to a multiplier via said multiplexor; and
routing said second vector input from a second memory to said multiplier via said multiplexor.

36. The method of vector floating point operation of claim 35 further comprising loading said first multiplication operand in said third memory; and
loading said second multiplication operand in said fourth memory.

37. The method of vector floating point operation of claim 36 wherein said executing said multiplication operation comprises:
performing said multiplication operation in a pipelined fashion so that there is at least one multiplication output at each clock cycle.

38. The method of vector floating point operation of claim 37 wherein said providing said multiplication output to said data source comprises:

placing said multiplication output on a bus; and
transferring said multiplication output from said bus to said multiplexor.

39. The method of vector floating point operation of claim 38 wherein said executing said addition operation comprises:
performing said addition operation in a pipelined fashion so that there is at least one addition output at each clock cycle, wherein said multiplication operation and said addition operation are executed in parallel.

40. The method of vector floating point operation of claim 39 further comprising:
reconfiguring said multiplexor to route data in said third memory and data in said fourth memory to said adder.

41. The method of vector floating point operation of claim 40 further comprising storing said multiplication output in said first memory.

42. The method of vector floating point operation of claim 41 wherein said third memory and fourth memory comprise a first and second first in first out (FIFO) memories, respectively.

43. The method of vector floating point operation of claim 42 wherein said multiplication operation comprises normalizing said multiplication output.

44. The method of vector floating point operation of claim 43 wherein said addition operation comprises normalizing said addition output.

45. A method of vector operation for a first and second vector input operands, said method comprising:
determining a first and second source registers from a plurality of registers for said first and second vector input operands, respectively, based on a first and second fields in a microcode instruction,
routing said first and second vector input operands from said first and second source registers to an execution unit;
executing said microcode instruction at said execution unit using said first and second vector input operands in a pipelined manner to generate a plurality of outputs;
determining a destination register from said plurality of registers for said plurality of outputs, respectively, based on a third field in said microcode instruction; and
routing said plurality of outputs from said execution unit to said destination register, wherein said routing said plurality of output is performed by a reconfigurable crossbar multiplexor.

46. The method of claim 45 wherein said plurality of registers comprise FIFO (first in first out) registers.

47. The method of claim 46 wherein said microcode instruction comprises a floating point multiplication.

48. The method of claim 47 wherein said microcode instruction comprises a floating point addition.

49. The method of claim 48 wherein said microcode instruction comprises a floating point to integer conversion.

50. The method of claim 49 wherein said microcode instruction comprises an integer to floating point conversion.

51. The method of claim 50 wherein said microcode instruction comprises a saturation filtering.

52. The method of claim 47 wherein said microcode instruction comprises a first field to control a reuse for data from one of said plurality of registers.

53. The method of claim 52 wherein said microcode instruction further comprises a second field to repeat said microcode instruction.

54. The method of claim 53 further comprising:

fetching data by an operand prefetcher and providing said data to said plurality of registers.

55. The method of claim 54 further comprising:

routing ones of said plurality of outputs from said execution unit to a data poster.

56. The method of claim 52 further comprising: repeating said microcode instruction.

57. The method of claim 56 further comprising:

repeating a plurality of microcode instructions.

58. The method of claim 52 further comprising:

suspending an execution of said microcode instruction based on a field entry in a command register.

* * * * *